March 2, 1971 R. W. MOORE 3,566,644
APPARATUS FOR SURFACE TREATING WORK PIECES
Filed Feb. 6, 1969 6 Sheets-Sheet 1

INVENTOR
RALPH W. MOORE
BY
*Arthur Frederick*
ATTORNEY

March 2, 1971  R. W. MOORE  3,566,644
APPARATUS FOR SURFACE TREATING WORK PIECES
Filed Feb. 6, 1969  6 Sheets-Sheet 2

INVENTOR
RALPH W. MOORE

BY
Arthur Frederick
ATTORNEY

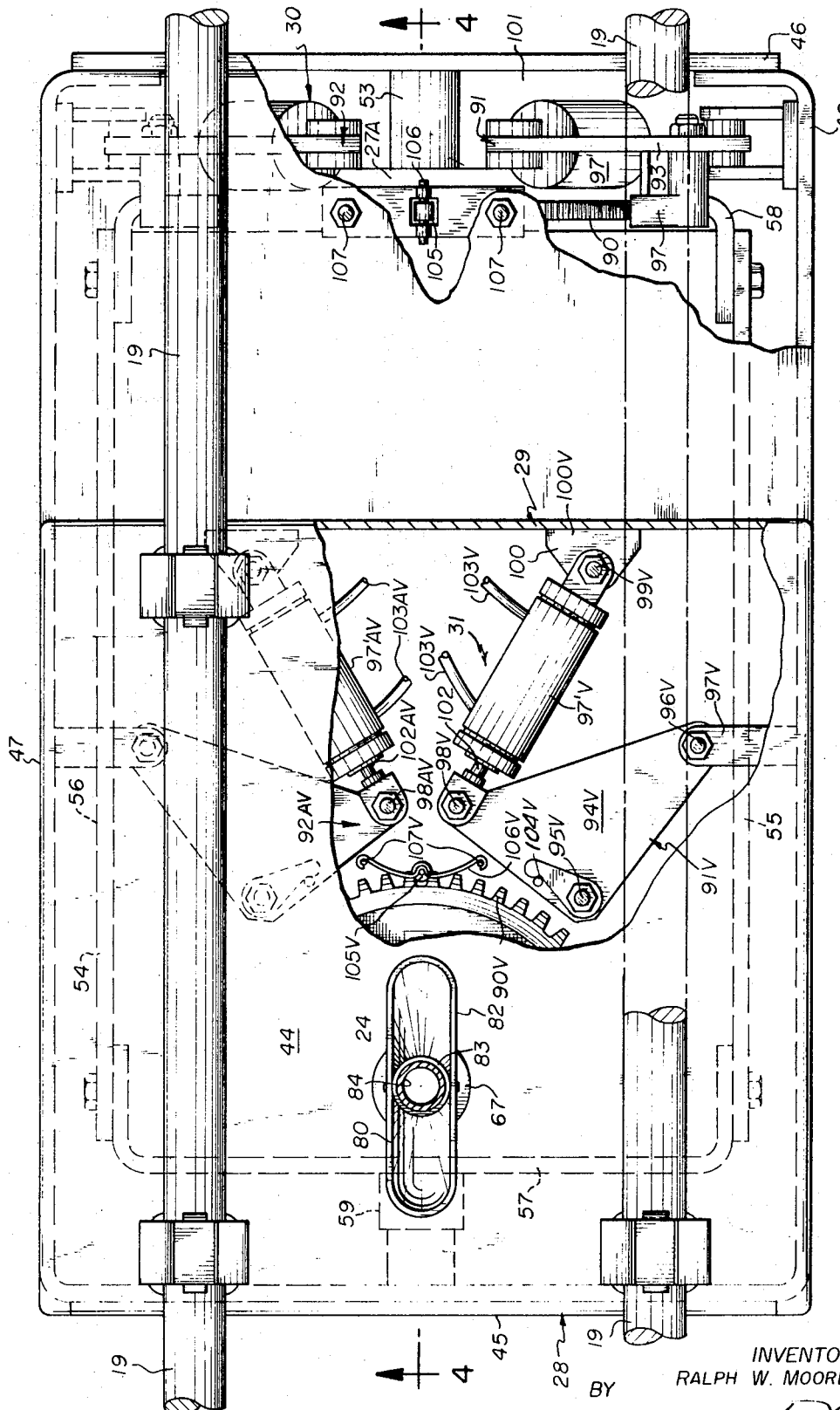

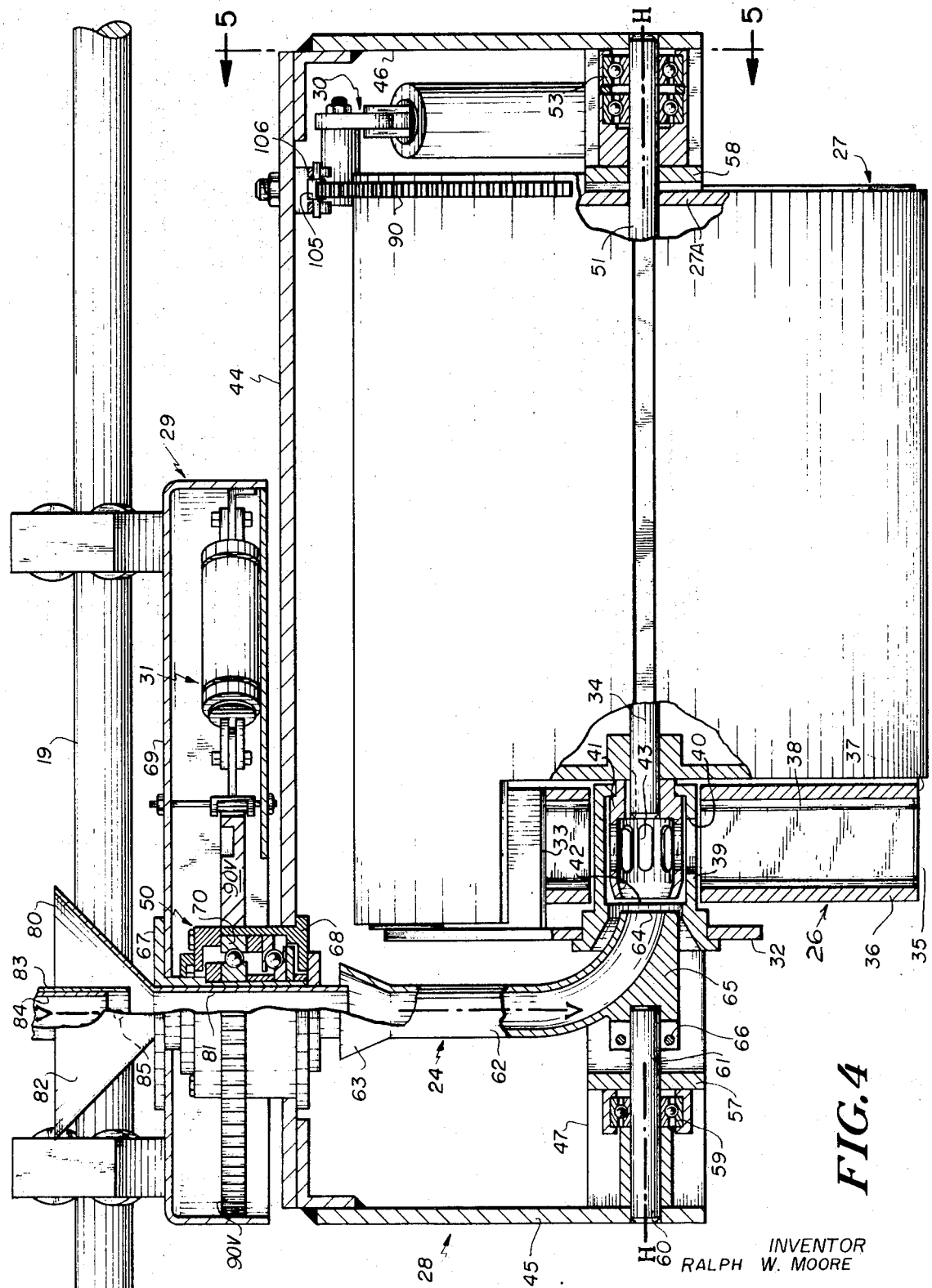

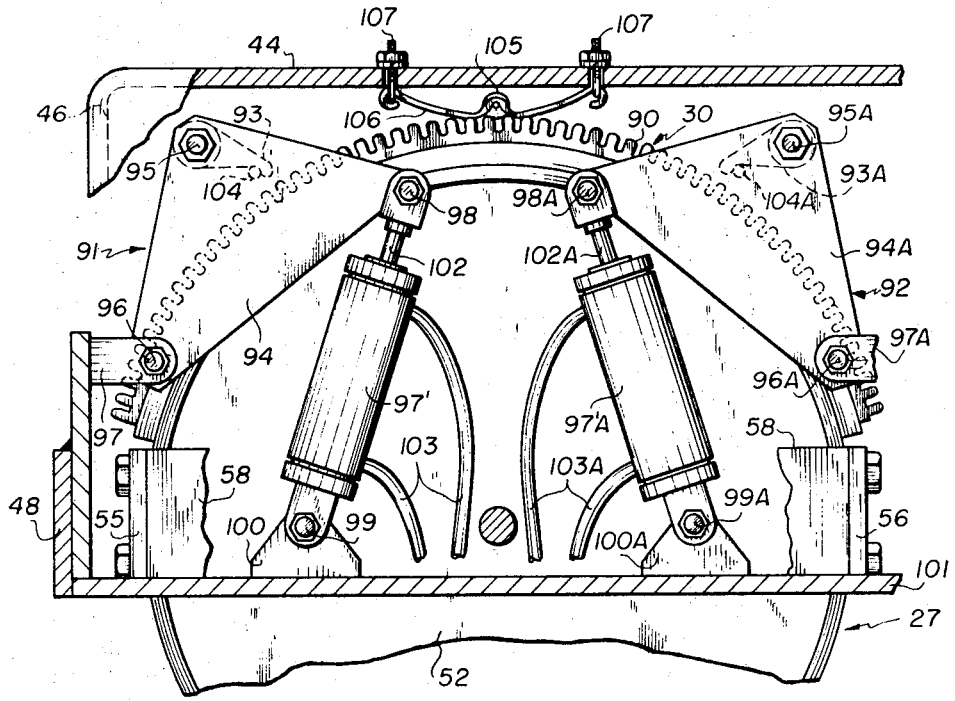

INVENTOR
RALPH W. MOORE

United States Patent Office 3,566,644
Patented Mar. 2, 1971

3,566,644
APPARATUS FOR SURFACE TREATING WORK PIECES
Ralph W. Moore, Hagerstown, Md., assignor to Metal Improvement Company (N.J.)
Filed Feb. 6, 1969, Ser. No. 797,090
Int. Cl. C21d 7/06
U.S. Cl. 72—53                    20 Claims

ABSTRACT OF THE DISCLOSURE

The apparatus for the surface treating of work pieces comprises a motor and a centrifugal throwing wheel connected for rotation to the motor, the throwing wheel having an axially arranged feed inlet for receiving peening particles to be projected into impingement with the work piece to be treated. A frame is provided to pivotally support the motor and throwing wheel about a first axis which is substantially coincident with the axis of rotation of the throwing wheel. A base member is pivotally connected to the frame for supporting the latter for movement about a second axis substantially normal to the axis of the throwing wheel. A peening particle supply conduit is disposed to communicate with a supply of peening particles and the feed inlet for delivering peening particles to the throwing wheel. The supply conduit is constructed and arranged so that portions of its longitudinal axie lie coincident with said first and second axes. A remote controlled indexing means is connected to coact with the frame, throwing wheel and motor to rotate the motor and throwing wheel about the first and second axes to thereby effect adjustment of the throwing wheel in a multiplicity of positions relative to the work piece to be treated.

BACKGROUND OF THE INVENTION

This invention relates to the art of polishing or surface finishing and, more particularly, to apparatuses of the type which forcefully project a directional stream of solid particles for impingement against a work piece to effect cleaning, peening or otherwise treating the surface of the workpiece.

Heretofore, surface treating apparatuses, such as abrading, cleaning or peening machines of the centrifugal throwing wheel type, which emit a stream of solid particles to impact against the surfaces of a work piece, have been constructed and supported in such a manner that the apparatuses could not be easily or quickly adjusted to provide different directions of stream flow for work pieces of different configuration or to provide for particle impacts against different surfaces of the same work piece. These apparatuses of relatively fixed orientation with respect to the work piece, as exemplified in the U.S. patents to Rosenberger et al., No. 2,590,576; Powell No. 2,732,666; Barnes No. 2,819,562; and Bowling Jr. et al., No. 3,319,383 are inefficient since the machines must be shut-down for a relatively long period to effect re-adjustment of the apparatus. In addition to the readjustment of present surface treating apparatuses being time consuming and difficult, such readjustments can only be achieved within relatively narrow limits and only within a plane normal to the axis of rotation of the throwing wheel. Many apparatuses have been devised to overcome this problem and provide a more operationally flexible device. Illustrative of such attempts are the apparatuses disclosed in the U.S. patents to Turnbull No. 2,240,248 and Minch No. 2,132,311 wherein the stream emitting apparatus is adjustable in one plane by limited movement of the centrifugal throwing wheel. Obviously, these types of apparatuses only provide very limited adjustment of the flow stream of particles. Other unsatisfactory or partial solutions to the problem have been apparatuses wherein the work piece is supported in such a manner that the work piece can be adjusted relative to the stream of particles. This type of apparatus is not satisfactory for very large workpieces or continuous production systems. The manually directed apparatus shown in the U.S. patent to Unger No. 2,263,321, obviously has severe limitations on its size and exposes the operator to ricocheting particles.

It is therefore an object of this invention to provide a surface treating apparatus capable of being adjusted to direct a particle stream in a multiplicity of directions.

It is another object of this invention to provide a surface treating apparatus capable of being adjusted in a multiplicity of positions from a location remote from the apparatus.

It is a further object of the present invention to provide a surface treating apparatus which is capable of being adjusted in position quickly and easily so that unproductive use of the apparatus is reduced to a negligible amount.

A feature of the present invention is the provision for pivotally supporting motor means and particle projecting means for conjoined movement about two axes extending substantially normal to each other and wherein portions of the axis of the solid particle supply conduit extends coincident with portions of the two axes of rotation.

Another feature of this invention is the provision of indexing mechanisms for pivoting the motor means and particle projecting means in predetermined increments about each of the two axes which extend substantially normal to each other.

A still further feature of the present invention is the provision of a fluid motor means cooperatively associated with each of the indexing mechanisms for actuating the latter to effect pivotal movement of the motor means and particle projecting means about each of the two axes extending substantially perpendicular to each other, the fluid motor means including control means located at a position remote from the fluid motor means.

SUMMARY OF THE INVENTION

Accordingly, it is contemplated by the present invention to provide a novel surface treating apparatus, having a centrifugal throwing wheel rotatively driven by a motor and a particle supply conduit for delivering solid particles to the throwing wheel for discharge in a stream against a work piece to be treated, supported for rotation about two axes which are substantially normal to each other and where portions of the longitudinal axis of the supply conduit are substantially coincident with the two axes of rotation. More specifically, this invention contemplates a housing or frame pivotally supporting the throwing wheel and motor for movement about a first axis which is substantially coincident with the axis of rotation of the throwing wheel, the frame, in turn, being supported for rotation about a second axis which is substantially normal to the first axis. A supply conduit is provided to communicate with a source of solid particles and the throwing wheel and disposed so that portions of the longitudinal axis of the supply conduit lie in substantially coincident relation to the first and second axes of rotation. The apparatus is also provided with an indexing means operatively associated with the frame, the throwing wheel and the motor to effect movement of the apparatus about the first and second axes. The indexing means includes a control means for actuating the indexing means, which control means is located at a point remote from the throwing wheel and motor.

The above described surface treating apparatus, according to this invention, may also be provided with rails for supporting the apparatus for rectilinear movement and a particle supply conduit, having a telescopically constructed portion, connected to the rectilinearly moveable portion of the apparatus to achieve delivery of solid particles to the throwing wheel in any linear position of the apparatus.

BRIEF DESCRIPTION OF THE DRAWINGS

The invention will be more fully understood from the following detailed description thereof, when considered in connection with the accompanying drawings, wherein but one embodiment of the invention is illustrated by way of example and in which:

FIG. 3 is an elevational plan view of the apparatus as shown in FIG. 2 and as viewed from a vantage point on the side of the apparatus adjacent the supporting rails;

FIG. 4 is a longitudinal cross-sectional view taken substantially along line 4—4 of FIG. 3;

FIG. 5 is a fragmentary view showing, in elevation, one of the indexing mechanisms;

FIG. 6 is a view similar to that of FIG. 5 on an enlarged scale showing various operative positions of the indexing mechanism.

DESCRIPTION OF THE PREFERRED EMBODIMENT

The invention is disclosed as applicable to a particle projecting means of the conventional centrifugal throwing wheel type, which is well known to those skilled in the art, but it should be understood that this application of the invention is merely illustrative of one application of the principles of the invention and that the invention may be applied to other types of particle projecting means emitting a unidirectional stream of solid particles, such as shot blasting nozzles wherein pressurized fluid, i.e. compressed air, propels the solid particles from the nozzles to the work piece to be treated.

WORK TREATING APPARATUS AND CABINET

Figure 1:
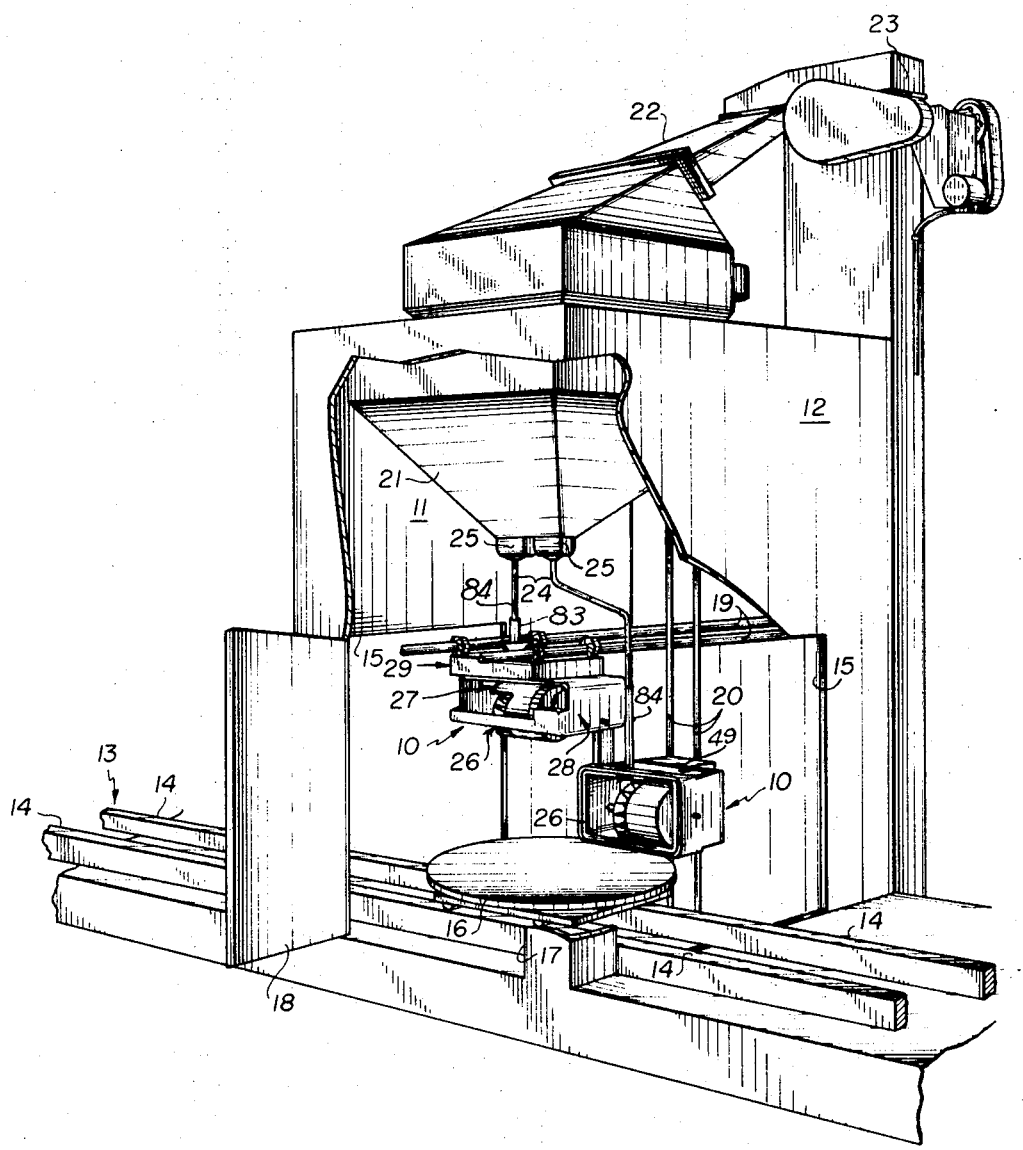
FIG. 1 is a perspective view showing two apparatuses according to this invention disposed in a cabinet associated with a production line, parts of the cabinet being broken away for illustration purposes only.

Now referring to the drawings and, more particularly, FIGS. 1 to 4 inclusive, the reference number 10 generally designates the surface treating apparatus according to this invention. As shown in FIG. 1, two apparatuses 10 are disposed within a work treating chamber 11 defined by a cabinet 12. While two surface treating apparatuses 10 are shown, it is to be understood that a work treating chamber is not required to have two apparatuses 10 but may have one, two or more than two apparatuses 10. The cabinet may be positioned over a conveyor system 13 which, as shown in FIG. 1, may consist of rails 14, extending through openings 15 in opposite side walls of cabinet 12, and a work table 16 supported on the rails for movement into and out of work chamber 11. The work table is suitably constructed and arranged to support thereon a work piece (not shown), the surfaces of which are to be treated. Suitable flexible seals, curtains or closure members (not shown) may be provided to close openings 15 during the work treating operation of the apparatus. An access opening 17 and an associated door 18 may also be provided in cabinet 13 to permit access to the interior of the cabinet for inspection, repair and adjustment of the work piece to be treated, if necessary. One of the apparatuses 10 may be supported for rectilinear, horizontal movement in chamber 11 by a pair of horizontally extending rails 19 while the other apparatus 10 may be supported for rectilinear, vertical movement in chamber 11 by a pair of vertically extending rails 20. Although apparatuses 10 are illustrated and described as preferably supported by rails 19 and 20 for horizontal and vertical, or other linear adjustment within chamber 11 of cabinet 12 relative to work table 16 and work piece (not shown) thereon, it is to be understood that apparatuses 10, at the obvious sacrifice of some flexibility of adjustment, may be fixedly supported within chamber 11 without departure from the scope and spirit of this invention.

PEENING PARTICLE SUPPLY SYSTEM

A peening particle supply system is associated with the cabinet, which system may comprise a hopper 21 disposed above apparatuses 10 and connected to a chute 22 which receives a supply of peening particles from a conveyor mechanism 23. For each of the apparatuses 10, a peening supply conduit means 24 is connected at one end to hopper 21 and, as more fully described hereinafter, at the opposite end to the associated apparatus 10 to conduct peening particles to the latter. An adjustable gate valve 25 of any suitable design well known in the art is mounted on hopper 21 at the outlet thereof to control the flow of peening particles to each of the supply conduits 24 so that the proper amount of peening particles is fed by gravity to each of the apparatuses 10.

Since each of the apparatuses are of like construction, only apparatus 10 which is shown in FIG. 1 supported on horizontal rails 19 will be hereinafter described in detail.

As best illustrated in FIGS. 2, 3, 4, and 5, apparatus 10 comprises essentially a centrifugal throwing wheel 26 connected to be rotatively driven by a motor 27, a housing or frame 28 pivotally supporting the throwing wheel 26 about a first axis H—H, and a base member 29 pivotally supporting frame 28 for rotative movement about a second axis V—V extending substantially perpendicular to the first axis H—H. The apparatus is also provided with an indexing means consisting of two novel indexing mechanisms 30 and 31 cooperatively associated with the aforementioned elements to effect rotative movement of throwing wheel 26 and motor 27 about axes H—H and V—V.

CENTRIFUGAL THROWING WHEEL

Figure 2:
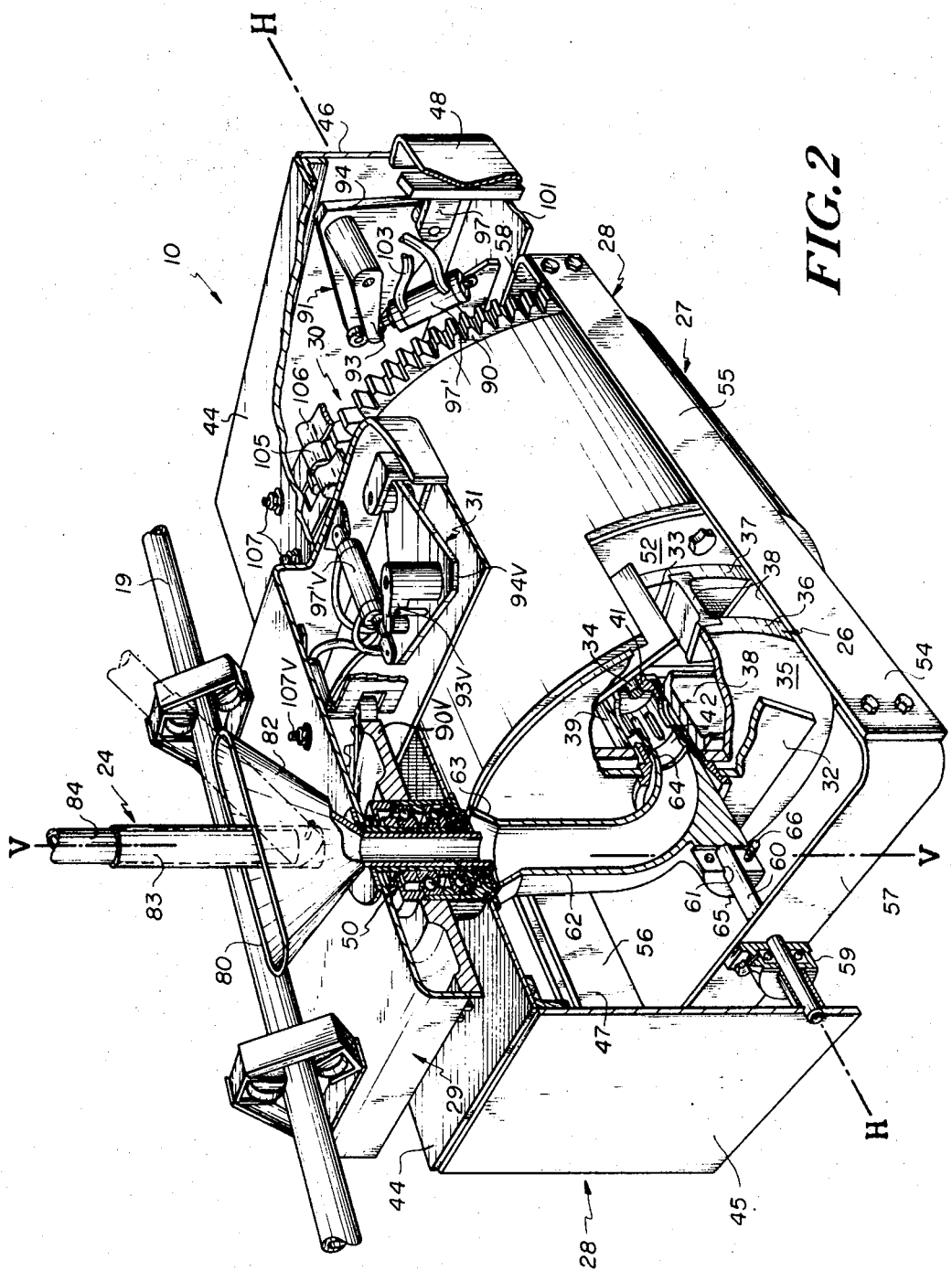
FIG. 2 is a view in perspective of the apparatus according to the present invention with parts broken away for the sake of illustration only.

As best shown in FIGS. 2 and 4, centrifugal throwing wheel 26 may be of conventional construction, as is well known by those skilled in the art and such as is disclosed in U.S. Pat. No. 2,132,311; 2,263,321; 2,708,814 and 2,732,666. Briefly, the throwing wheel, as shown, comprises a cylindrical housing 32 having a peripheral discharge opening 33. A rotor 35 is disposed within housing 32 and is connected for rotation to the driving shaft 34 of motor 27, which motor may be any suitable electric or fluid driven rotary motor. The rotor 35 consists of two discs 36 and 37 held in spaced parallel relationship by a plurality of circumferentially spaced, radially extending throwing blades 38. Disposed coaxially within rotor 35 is a cup-shaped control cage 39 which is mounted for rotative adjustment relative to the rotor. The cage 39 has a feed slot 40 which is peripherally located to communicate with the inner portions of the chambers formed between discs 36 and 37 and next adjacent blades 38. An impeller 41 is coaxially disposed within the control cage 39 and connected to driving shaft 34 for conjoined rotation with the latter. The impeller 41 has an axial, concentric opening disposed in a coaxial relationship with the open end portion of cup-shaped control cage 39 to thereby form with said open end portion an inlet port 42 for peening particles delivered thereto by supplyl conduit 24. A plurality of peripheral openings 43 are provided in impeller 41 to communicate with feed slot 40 of control cage 39 and pass peening particles to the feed slot.

In operation of throwing wheel 26, peening particles delivered to the rotating impeller 41, from supply conduit 24, through axial inlet port 42, are centrifugally impelled outwardly through openings 43 and, thence, through feed slot 40. From feed slot 40, the peening particles are fed to the inner ends of throwing blades 38, at a predetermined controlled location. The peening particles are then propelled along the throwing blades and discharged from the wheel, through discharge opening 33, in a continuous stream toward the work piece to be treated.

SUPPORTING FRAMES

The housing or frame 28, within which throwing wheel 26 and motor 27 are suported for pivotal movement about axis H—H relative to the frame, comprises a planar top portion 44, contiguous depending opposite end walls 45 and 46 and opposite side walls 47 and 48. As shown, side walls 47 and 48 have elongated openings 49 therein. The frame 28 is pivotally suspended from base member 29 by a bearing assembly 50 supported in base member 29, which bearing assembly permits rotative movement of frame 28 about axis V—V which extends substantially normal to axis H—H.

As is shown in FIG. 4, driving shaft 34 of motor 27 has a portion 51 projecting beyond the right end wall 27A of motor housing 52, as viewed in FIGS. 3 and 4. Shaft portion 51 is journaled in a ball bearing assembly 53 mounted on the end wall 46 of frame 28 to thereby provide one of the pivots for supporting throwing wheel 26 and motor 27 for rotation about axis H—H which is substantially coincident with the longitudinal axis of driving shaft 34. The other pivotal support means for supporting the throwing wheel and motor subassembly for rotative movement about axis H—H includes a rectangular bracket 54 which surrounds throwing wheel and motor subassembly and lies within frame 28. The bracket 54 consists of two spaced side plates 55 and 56, extending on opposite sides of the motor housing 52 and substantially parallel to the longitudinal axis of driving shaft 34 and motor 27, and two end plates 57 and 58 interconnecting the opposite adjacent end portions of side plates 55 and 56. The side plates 55 and 56 are secured to motor housing 52 by welding or other suitable means. The end plate 58 extends adjacent end wall 27A of motor housing 52 and is supported on shaft portion 51 of driving shaft 34. A ball bearing assembly 59 is secured to end plate 57 in substantial alignment with the longitudinal axis of driving shaft 34, and is constructed and arranged to receive a pivot pin 60 therethrough. The pivot pin 60 is dimensioned to extend through registered holes in end wall 45 and end plate 57 into a recess 61 in an inner section 62 of peening particle supply conduit means 24 to support the inner section as hereinafter more fully described. As illustrated, inner section 62 is formed to define an arcuate flow passageway having a flared inlet portion 63 and an outlet portion 64 dimensioned to be receivable in inlet port 42 of throwing wheel 26. The inner section 62 has a proturberance 65 in which recess 61 is bored. The protuberance 65 is bifurcated the length of recess 61. Clamping screws 66 are provided in the protuberance to draw the bifurcated portions together to grip the portion of pivot pin 60 lying in recess 61. Pivot pin 60 is secured, in any suitable manner against rotation, as by welding, to end wall 45 of frame 28 so that, when screws 66 are turned to clamp inner section 62 to pivot pin 60, inner section 62 is held in fixed relation to frame 28.

VERTICAL BEARING ASSEMBLY

Figure 7:
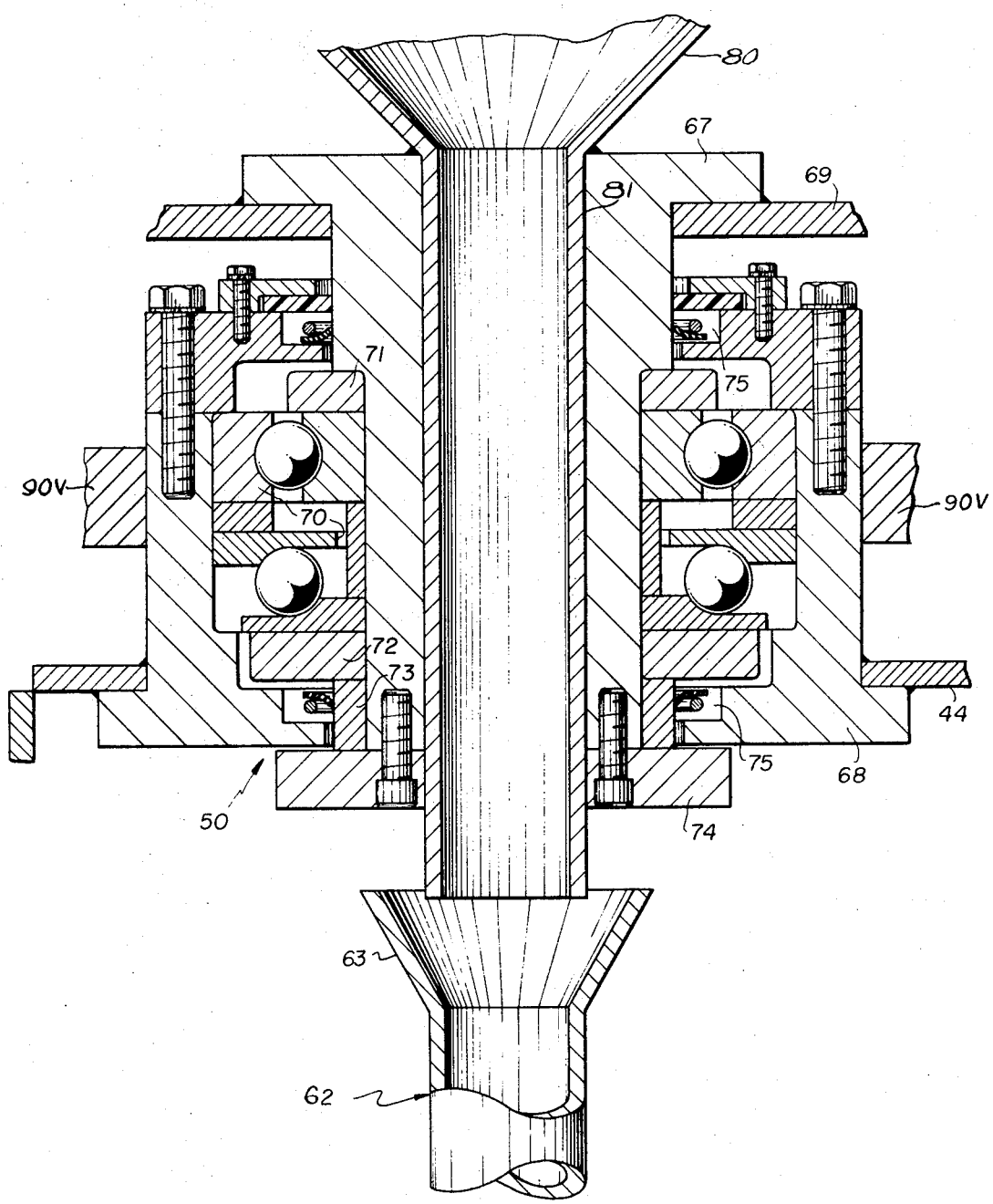
FIG. 7 is a fragmentary enlarged sectional view of the vertical bearing assembly.

As best shown in FIG. 7, bearing assembly 50 comprises a sleeve 67 fixedly secured, as by welding or other suitable means, to top 69 of base member 29 with its longitudinal axis extending in substantial alignment with the longitudinal axis of inner section 62 of supply conduit 24. The sleeve 67 is dimensioned to extend coaxially within a tubular hub 68 which is secured to the top 44 of frame 28. A pair of ball bearings 70 are disposed between sleeve 67 and hub 68 and secured in place by spacer rings 71, 72 and 73 surrounding sleeve 67 and a retainer ring 74 which is bolted or otherwise suitably secured to sleeve 67. Seals 75 are mounted on hub 68, to seal the interstices between sleeve 67 and hub 68 to protect the bearings 70 from dust and other foreign matter produced in the peening operation. A gear wheel 90V, forming part of the indexing mechanism 31, is keyed, or secured in some other conventional manner, to hub 68 for conjoined rotative movement about sleeve 67 to thereby effect rotation of frame 28 relative to base member 29 and about axis V—V.

To provide for the delivery of peening particles to inner section 62 of supply conduit 24, a generally oval shaped funnel section 80 is positioned with the stem portion 81 thereof extending coaxially through sleeve 67 and with the flared oval shaped portion 82 disposed with its longer axis extending parallel to rails 19. Funnel section 80 is dimensioned so that the lower end of stem portion 81 lies slightly within the flared inlet portion 63 of inner section 62. The funnel section 80 is fixed in position by being secured to the top 69 of base member 29, as by welding or the like. As best shown in FIGS. 2 and 4 telescopically arranged tubes 83 and 84 are pivotally secured to the flared oval shaped portion 82 of funnel 80. The tube 83, which is of larger diameter than tube 84, is pivotally secured by pivot pin 85 to portion 82 and adapted to slidably receive therein, through the distal end, the smaller diameter tube 84. The opposite end of tube 84 is secured to hopper 21. The portion of tube 84 adjacent hopper 21 may be of flexible construction. The extent of the slidable interconnection between tubes 83 and 84 is determined by the maximum linear locations of the apparatus along rails 19 while maintaining communication between tubes 83 and 84 in those extreme positions. The tubes 83 and 84, funnel section 80 and inner section 62 constitutes the entire supply conduit means 24 by which peening particles are fed to throwing wheel 26.

HORIZONTAL INDEXING MECHANISM

As previously stated, rotative movement of throwing wheel 26 and motor 27 about axis H—H is achieved by indexing mechanism 30. As best illustrated in FIG. 5, indexing mechanism 30 comprises a ratchet gear segment 90 secured to the upper portion of end wall 27A of motor housing 52 by welding or in some other suitable manner well known to those skilled in the art. A pair of pawl actuating sub-assemblies 91 and 92 are disposed adjacent ratchet wheel segment 90 to engage the latter. The pawl actuating sub-assembly 91 functions to rotate ratchet wheel segment 90 clockwise while pawl actuating sub-assembly 92 operates to rotate ratchet gear segment 90 in a counter-clockwise direction as viewed in FIG. 5. Since the construction and function of pawl actuating subassemblies 91 and 92 are identical, only subassembly 91 will be described in detail hereinafter.

The pawl actuating subassembly 91 comprises a pawl 93 pivotally mounted on a pin 95 at one corner of a triangular shaped bracket 94. The bracket 94 is pivotally connected at another corner thereof to side wall 48 of frame 28 by a pin 96 extending through an ear 97 secured to frame 28. To pivot bracket 94 about pin 96, a double-acting piston, fluid motor 97′ is pivotally connected to a third corner of bracket 94 by a pin 98. The opposite end of motor 97′ is pivotally connected at 99 to an upstanding ear 100 secured to a horizontal plate 101 which, in turn, is connected to the bottom portion of frame 28. As shown, piston rod 102 may be connected to bracket 94 and the casing or cylinder of the motor connected to ear 100. Two fluid supply hoses 103 are connected at opposite ends of fluid motor 97′ and to a source (not shown) of pressurized fluid, such as an air compressor to conduct pressurized fluid, alternately, to opposite sides of the fluid motor to cause reciprocative movement of the piston (not shown) of the motor and the extension or retraction of piston rod 102. A pressurized fluid control means (not shown), located remotely from apparatus 10 and outside peening chamber 11. is provided to permit an operator to control flow of pressurized fluid through hoses 103 and, hence, actuation of motor 97'. A stop pin 104 is provided to project from the surface of bracket 94 to engage and limit downward pivotal movement of pawl 93 which is biased by a spring (not shown) toward the stop pin.

In operation of the pawl actuating subassembly 91, retraction of piston rod 102 causes bracket 94 to pivot about pin 96 and, thereby, carry pawl 93 into engagement with the ratchet gear segment 90 as shown by the broken lines in FIG. 6. Continued retraction of piston rod 102 and pivotal movement of bracket 94 causes pawl 94 to exert a rotative force on ratchet gear segment 90 in a clockwise direction. This rotation is accomplished because the pawl is held between the lead gear tooth it abuts and stop pin 104. When rotation of substantially one gear tooth is achieved and the pawl actuating subassembly is in the position shown in dash-double-dotted lines in FIG. 6, continued pivotal movement, if any, of bracket 94 causes the pawl to pivot upwardly about pin 95 under the camming action of the lead tooth. The extension of piston rod 102 to return bracket 94 to the neutral position shown in full lines causes the bracket 94 to pivot about pin 96 in a counter-clockwise direction as viewed in FIG. 5, thereby carrying pawl 93 out of engagement with ratchet gear segment 90, the pawl then pivoting against stop pin 104.

To insure indexing of ratchet gear segment 90 a distance of one gear tooth for each reciprocative movement of piston and piston rod 102 of motor 97', a spring biased, stop roller 105 is provided to engage ratchet gear segment 90. The stop roller 105 is carried in a leaf spring 106 which, in turn, is secured by U-shaped bolts 107 to top 44 of frame 28 in a preloaded condition to exert a force in a direction toward the ratchet gear segment 90. Obviously, if ratchet gear segment 90 is rotated more than or less than the distance equivalent to one tooth, roller 105 will properly position ratchet gear segment by camming against the gear teeth under the force exerted by spring 106. Of course, the preset tension of spring 106 is of such value that it does not prevent rotation of ratchet gear segment 90 by pawl 93 and yet is of sufficient magnitude to firmly hold the throwing wheel and motor subassembly from inadvertent rotation about axis H—H.

The construction and function of pawl actuating subassembly 92 is identical to that described with respect to pawl actuating subassembly 91 and differs only in that it effects rotation of ratchet gear segment 90 in the opposite or, as viewed in FIG. 5, counter-clockwise direction. In view of the foregoing, parts of pawl actuating subassembly 92, corresponding to pawl actuating subassembly 91, will be designated by the same reference number, except for the addition of the suffix A thereto.

VERTICAL INDEXING MECHANISM

To rotate frame 28 and the throwing wheel and motor subassembly about the vertical axis V—V, the indexing mechanism 31 is mounted on base member 29. The indexing mechanism is essentially the same as indexing mechanism 30, except that a ratchet gear wheel 90V is provided instead of a ratchet gear segment. As best seen in FIGS. 4 and 7, gear wheel 90V is keyed or otherwise suitably secured to hub 68 of bearing assembly 50. Because of the identical nature of indexing mechanims 30 and 31, parts of indexing mechanism 31 corresponding to like parts of indexing mechanism 30 will be designated by the same reference character except that the number will have the suffix V added thereto. Also, since the indexing mechanisms 30 and 31 are essentially the same, indexing mechanism 31 will not be described in detail; it is believed sufficient to merely point out that the pawl actuating subassemblies 91V and 92AV of indexing mechanism 31 are mounted on base member 29 so as to be selectively actuated to engage and rotate ratchet gear wheel 90V in a clockwise or counter-clockwise direction about axis V—V relative to base member 29.

RAIL SUPPORTS

As previously stated, one of the apparatuses 10 may be supported on rails 19 for linear movement within peening chamber 11. The rails 19 may comprise two spaced parallel tubular members supported at opposite end portions within chamber 11. Two aligned, tri-wheel assemblies 110 for each rail 19 are secured by welding, bolting, or the like, to the top 69 of base member 29. Each tri-wheel assembly embraces each rail 19 so that apparatus is suspended from the rails for linear movement but restrained against lateral movement. The movement of apparatus 10 along rails 19 may be manually achieved or may be moved by a suitable power means (not shown), such as connecting base member 29 by a cable to a reel driven by a reversible motor, or a motor driven worm screw and nut assembly. The power means may, also, include a brake mechanism so that the apparatus is held in the desired location on rails 19. This is particularly necessary with respect to apparatus 10 which is supported on vertically extending rails 20.

The apparatus 10, which is shown in FIG. 1 supported on vertical rails 20, is identical with the apparatus 10 herein described in detail and supported on horizontal rails 19. The only difference between the apparatuses is that inner section 62 is rotated, from the position shown in FIG. 2, to alignment with the opening 49 in side wall 47 or 48. The tube 83, which was previously described as pivotally secured to funnel section 80, rests within inner section 60 on the inner side walls of the funnel section so that communication with inner section 60 is maintained during limited rotation of the apparatus about both a vertical and a horizontal axis. Manifestly when the apparatus is moved on vertical rails 20, supply conduit 24 telescopically extends or collapses by relative movement of tubes 83 and 85.

OPERATION

In operation of the apparatus 10 supported on rails 19 and herein described in detail, a work piece (not shown) the surface of which is to be peened, is positioned within chamber 11 on table 16. By manipulation of appropriate control elements, (not shown), of a conventional control means, (not shown), located exteriorly of chamber 11, flow of pressurized fluid is directed, through hoses 103, to the fluid motors 97' or 97'A to effect movement of throwing wheel 26 and motor 27 about axis H—H and to fluid motors 97'V or 97'AV to cause rotative movement of throwing wheel 26, motor 27 and frame 28 about axis V—V. Thus, the apparatus 10 can be accurately positioned with respect to the work piece so that the stream of peening particles emitted from the throwing wheel 26 impinges the desired surfaces of the work piece. It has been found that a maximum range of rotation of about 90° about the vertical axis V—V and a maximum range of rotation of approximately 45° around the horizontal axis H—H is sufficient to provide the scope of adjustment necessary for practically all operations. If a different surface of the same or a different work piece is to be peened, apparatus 10 can be quickly and easily repositioned, as above set forth, to direct peening particle impacts on the surface to be treated. Since rotation of the apparatus about axes H—H and V—V is achieved in equal increments corresponding to the gear teeth spacing, the orientation of throwing wheel and motor with respect to the work can be predetermined; as for example, as so many stop positions clockwise or counter-clockwise from a neutral position, which position may be visible by reference marks on the apparatus or by placing sensing means on the apparatus to transmit a signal to a receiver located at the remote control means.

It is believed now readily apparent that the present invention provides a surface treating apparatus which is capable of accurate adjustment relative to a work piece to be treated over a relatively wide range of positions. It is an apparatus which may be quickly and easily repositioned relative to a work piece to effect treatment of a multiplicity of work piece surfaces without repositioning of the work piece. It is also an apparatus in which adjustment of the apparatus can be achieved from a point remote from the apparatus and exteriorly of the peening chamber. Furthermore, it is an apparatus which can be programmed for various positions to achieve the treatment of differently orientated surfaces on the work piece, thus eliminating trial and error type set-up work.

Although but one embodiment of the invention has been illustrated and described in detail, it is to be expressly understood that the invention is not limited thereto. Various changes can be made in the arrangement of parts without departing from the spirit and scope of the invention, as the same will now be understood by those skilled in the art.

What is claimed is:

1. An apparatus for the surface treating of work pieces comprising
   (a) a solid particle projecting means for discharging a stream of solid particles against a work piece to be treated;
   (b) a support means for supporting said solid particle projecting means for rotation about two axes which extend substantially normal to each other;
   (c) a solid particle supply conduit means communicating with a source of solid particles and with the solid particle projecting means to convey solid particles to the latter;
   (d) said supply conduit means having portions thereof asociated with the said support means and said projecting means so that portions of its longitudinal axis extend substantially coincident with each of said two axes of rotation; and
   (e) adjusting means for effecting rotation of the solid particle projecting means about each of said two axes to position the apparatus so that the stream of solid particles is directed to impinge the surfaces of the work pieces to be treated.

2. The apparatus of claim 1 wherein said particle projecting means comprises a centrifugal throwing wheel driveably connected to a rotary motor for rotation.

3. The apparatus of claim 1 wherein said support means comprises a base member and a frame pivotally connected to said base member for movement around one of said two axes, the frame pivotally supporting said solid particle projecting means for rotation about the other of said two axes.

4. The apparatus of claim 1 wherein said support means is connected to rail means for providing rectilinear movement of the apparatus.

5. The apparatus of claim 1 wherein said adjusting means includes an indexing means cooperatively coacting with said support means and said solid particle projecting means to effect rotation of the projecting means about each of said two axes in predetermined increments.

6. The apparatus of claim 4 wherein said supply conduit means includes a telescopically constructed portion pivotally connected to said portion fixedly associated with the support means whereby communication of the particle projecting means with the source of solid particles upon rectilinear movement of the apparatus on said rails is maintained.

7. An apparatus for the surface treating of work pieces comprising
   (a) a centrifugal throwing wheel;
   (b) a motor connected to rotate the throwing wheel;
   (c) said throwing wheel having an inlet means for receiving solid particles to be discharged by the throwing wheel in a stream against the surfaces of work pieces;
   (d) a support means for supporting said throwing wheel and said motor for rotation about two axes which extend substantially normal to each other;
   (e) a solid particle supply conduit means communicating with a source of solid particles and the inlet means of the throwing wheel to convey solid particles to the latter;
   (f) said supply conduit means having portions thereof fixedly associated with said support means and disposed with the longitudinal axis of one portion lying substantially coincident with one of said two axes of rotation and the longitudinal axis of the other portion lying substantially coincident wtih the other axis of rotation; and
   (g) adjusting means for effecting rotation of the solid particle projecting means to position the throwing wheel so that the stream of solid particles is directed to impinge the surfaces of the work pieces to be treated.

8. The apparatus of claim 7 wherein said adjusting means includes an indexing means coacting with said support means, said throwing wheel and the motor to provide for rotation of the throwing wheel and motor independently about each of said two axes in predetermined increments to achieve accurate positioning of the apparatus.

9. The apparatus of claim 7 wherein said support means comprises a base member and a frame pivotally connected to the base member for rotative movement around one of said two axes, the frame pivotally supporting said throwing wheel and motor for rotation about the other of said two axes.

10. The apparatus of claim 1 including rail means for supporting the entire apparatus for rectilinear movement.

11. The apparatus of claim 1 wherein said motor has a drive shaft, the axis of which is substantially coincident with the axis of rotation of the throwing wheel.

12. An apparatus for the surface treating of work pieces comprising
   (a) a centrifugal throwing wheel;
   (b) a rotary motor drivably connected to the throwing wheel to effect rotation of the latter;
   (c) said throwing wheel being provided with an inlet means for receiving solid particles to be discharged by the throwing wheel in a stream impinging the surfaces of work pieces to be treated;
   (d) a supply conduit communicating with a source of solid particles and with the inlet means of the throwing wheel to receive and deliver solid particles to said inlet means;
   (e) a frame pivotally supporting said throwing wheel and motor for rotative movement about a first axis lying substantially coincident with the axis of rotation of the throwing wheel;
   (f) a base member disposed adjacent said frame and connected to support said frame for rotative movement about a second axis extending substantially normal to the first axis;
   (g) said supply conduit having one portion thereof disposed to extend through said base member and said frame with the longitudinal axis of said portion lying substantially coincident with said second axis of rotation; and
   (h) adjusting means for effecting rotation of the throwing wheel about each of said first and second axes to position said throwing wheel so that the stream of solid particles discharged by the throwing wheel is directed to impinge the surfaces of the work pieces to be treated.

13. The apparatus of claim 12 wherein said base member is supported by rail means for rectilinear movement of the apparatus along said rail means.

14. The apparatus of claim 12 wherein said adjusting means includes an indexing mechanism coacting with said base member, frame and motor for rotating said throwing wheel and motor about said first and second axes.

15. The apparatus of claim 14 wherein said indexing mechanism includes a control means disposed at a location remote from the throwing wheel and motor for controlling actuation of the indexing mechanism.

16. The apparatus of claim 14 wherein the indexing mechanism comprises two assemblies one of which comprises a gear means secured to the frame for conjoined rotation therewith, a pawl means pivotally mounted on the base member adjacent said gear means, and an actuating means connected to the pawl means and the base member to cause the pawl means to engage the gear and effect rotative movement of the gear and thereby rotation of the frame about said second axis; the other assembly comprises a second gear means secured for conjoined rotation with the motor and throwing wheel, a second pawl means pivotally mounted on the frame adjacent said second gear means, and a second actuating means connected to the second pawl means and the frame to cause the second pawl means to engage the second gear means and effect rotative movement of the gear and hence the frame about said first axis.

17. The apparatus of claim 16 wherein said first and second pawl means consists of a pair of pawls and said first and second actuating means each consists of a pair of rectilinear fluid motors, one motor for each pawl to effect movement of the associated pawl into and out of engagement with the associated gear means.

18. The apparatus of claim 12 wherein said motor drive and the axis of rotation of the throwing wheel is in alignment.

19. An apparatus for surface treating work pieces by impact of solid particles against the surfaces of the work pieces comprising:
 (a) a centrifugal throwing wheel having an axially disposed inlet port for receiving solid particles for projection thereof in a stream against the work pieces to be treated;
 (b) a rotary motor having a drive shaft connected to the throwing wheel to effect rotation of the latter;
 (c) a frame for supporting said throwing wheel and rotary motor for rotative movement about a first axis lying substantially coincident with the axis of rotation of the throwing wheel and rotary motor drive shaft;
 (d) a base member disposed adjacent said frame and having a bearing;
 (e) said frame being rotatively supported in the bearing of said base member for movement about a second axis extending substantially perpendicular to the first axis;
 (f) a supply conduit means disposed in communication with a source of solid particles and the inlet port of the throwing wheel to conduct solid particles to the latter;
 (g) the supply conduit means comprises a first section and a second section;
 (h) the first section being disposed to extend substantially coaxially through the bearing in said base member and into communication with the axially arranged inlet port of the throwing wheel;
 (i) the second section being connected at one end with the source of solid particles and at the opposite end to the first section to deliver solid particles to the latter;
 (j) a first indexing mechanism coacting with the frame, throwing wheel and motor to cause the throwing wheel and motor to be rotated about said first axis, and
 (k) a second indexing mechanism coacting with the base member and the frame to provide for rotation of the frame about said second axis.

20. The apparatus of claim 19 wherein each of said first and second indexing mechanisms have a holding means for insuring rotative movement in equal increments and to hold the selected position against accidental movement.

References Cited

UNITED STATES PATENTS

| | | | |
|---|---|---|---|
| 2,132,311 | 10/1938 | Minich | 51—9 |
| 2,240,248 | 4/1941 | Turnbull | 51—9 |
| 2,263,321 | 11/1941 | Unger | 51—9 |
| 2,590,576 | 3/1952 | Rosenberger | 51—9 |
| 2,708,814 | 5/1955 | Straub | 51—9 |
| 2,732,666 | 1/1956 | Powell | 51—9 |
| 2,819,562 | 1/1958 | Barnes | 51—9 |
| 3,319,383 | 5/1967 | Bowling | 51—9 |

CHARLES W. LANHAM, Primary Examiner

G. P. CROSBY, Assistant Examiner

U.S. Cl. X.R.

59—9